US012781866B2

(12) United States Patent
Greci et al.

(10) Patent No.: US 12,781,866 B2
(45) Date of Patent: Nov. 3, 2026

(54) SUCTION RETAINER FOR A CHECK VALVE

(71) Applicant: Halliburton Energy Services, Inc, Houston, TX (US)

(72) Inventors: Stephen Michael Greci, Carrollton, TX (US); Hadi Arabnejad Khanouki, Carrollton, TX (US); Ryan W. Mcchesney, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/012,617

(22) Filed: Jan. 7, 2025

(65) Prior Publication Data

US 2026/0194153 A1 Jul. 9, 2026

(51) Int. Cl.

*F16K 27/02* (2006.01)
*E21B 34/08* (2006.01)
*F16K 15/02* (2006.01)
*F16K 15/04* (2006.01)

(52) U.S. Cl.

CPC .......... *F16K 27/0209* (2013.01); *E21B 34/08* (2013.01); *F16K 15/04* (2013.01); *E21B 2200/04* (2020.05); *F16K 15/026* (2013.01); *Y10T 137/7911* (2015.04)

(58) Field of Classification Search

CPC .... F16K 27/0209; F16K 15/04; F16K 15/026; F16K 2200/502; E21B 34/08; E21B 2200/04; Y10T 137/7911

USPC ...................................................... 137/533.13

See application file for complete search history.

(56) References Cited

U.S. PATENT DOCUMENTS 1,015,142 A * 1/1912 Criswell ................. F16K 15/04 137/332
1,025,977 A * 5/1912 Henderson .............. F16K 15/03 137/515.3
1,074,191 A * 9/1913 Mixer ...................... F16K 15/04 137/329
1,313,522 A * 8/1919 Cressy .................... H01T 13/14 313/143
1,329,738 A * 2/1920 Alexander .............. F16K 15/04 137/533.13
1,443,016 A * 1/1923 Eubanks ............. F04B 53/1002 137/533.13

(Continued)

OTHER PUBLICATIONS

International Search Report and Written Opinion mailed Sep. 29, 2025 in PCT/US25/13448.

*Primary Examiner* — William M Mccalister
(74) *Attorney, Agent, or Firm* — The Hilton Firm PLLC

(57) ABSTRACT

Check valves with suction retainers and methods of using the same. A check valve has a valve housing with a flow path. A restriction in the flow path narrows the diameter of the flow path. A blocking member in the flow path moves in the flow path to block the restriction and at least partially seal the flow path. A suction retainer has a longitudinal axis. The suction retainer is in the flow path. The suction retainer has a central component disposed on the longitudinal axis with a throughbore along the longitudinal axis. The suction diverts flow to an exterior of the central component such that the fluid flows around the central component to reduce pressure in the throughbore. The reduction in pressure retains the blocking member on the retaining end.

20 Claims, 8 Drawing Sheets

(56) References Cited

U.S. PATENT DOCUMENTS

| | | | | | |
|---|---|---|---|---|---|
| 1,679,283 | A * | 7/1928 | Wells | F16K 15/04 | 137/533.13 |
| 2,274,968 | A * | 3/1942 | O'Bannon | F16K 15/04 | 137/533.13 |
| 2,589,581 | A * | 3/1952 | Sokolik | F16K 15/04 | 137/533.13 |
| 2,939,475 | A * | 6/1960 | Roach | F16K 31/084 | 137/533.13 |
| 3,026,903 | A * | 3/1962 | Roach | F16K 31/08 | 137/533.15 |
| 3,603,340 | A * | 9/1971 | Rousselet | E03F 5/12 | 137/533.13 |
| 3,724,496 | A * | 4/1973 | Secrist | F16K 15/04 | 137/533.13 |
| 3,932,898 | A * | 1/1976 | Wright | A61F 2/2424 | 137/533.15 |
| 4,246,002 | A * | 1/1981 | Bell | F23D 14/825 | 137/533.15 |
| 4,655,247 | A | 4/1987 | Westra | | |
| 4,674,529 | A * | 6/1987 | Ferguson | F16K 27/0245 | 137/533.13 |
| 5,178,184 | A * | 1/1993 | Skillman | F16K 15/04 | 137/533.15 |
| 5,799,689 | A * | 9/1998 | Tang | F16K 15/04 | 137/533.15 |
| 5,829,952 | A | 11/1998 | Shadden | | |
| 6,056,012 | A * | 5/2000 | Yuen | F16K 15/1848 | 137/533.13 |
| 6,202,678 | B1 * | 3/2001 | Hawkins | F16K 17/285 | 137/460 |
| 6,685,451 | B1 | 2/2004 | Ivey | | |
| 10,948,093 | B2 * | 3/2021 | Czarnecki | F16K 15/035 | |
| 2006/0201557 | A1 * | 9/2006 | Shieh | F16K 15/04 | 137/533.11 |
| 2010/0269928 | A1 | 10/2010 | Ford | | |
| 2020/0208503 | A1 | 7/2020 | Dyck et al. | | |
| 2021/0246992 | A1 * | 8/2021 | Ford | F16K 15/04 | |

* cited by examiner

SUCTION RETAINER FOR A CHECK VALVE

TECHNICAL FIELD

The present disclosure relates generally to downhole tools, and more particularly, to a suction retainer within a check valve that uses suction to retain the blocking member in a designated position once the valve is opened.

BACKGROUND

Wellbore tools may use check valves to provide one way flow of a fluid through a wellbore conduit or downhole tool. Check valves utilize a blocking member that moves within the valve housing to allow fluid flow in one direction upon exceeding a pressure threshold, known as the cracking pressure. Fluid flow in the opposing direction results in the blocking member being moved in the opposite direction to block fluid flow through the check valve.

High velocity fluids flowing over the blocking member may create low pressure on the front side of the blocking member and high pressure on the backside of the blocking member. This pressure difference may cause the blocking member to get pushed against the fluid flow. However, once the blocking member gets pushed too close to the restriction opening in the valve flow path, the high velocity fluid may provide sufficient force to push the blocking member backward in the direction of the fluid flow. This constant push and pull may result in high frequency movement or vibration of the blocking member, which may be undesirable in some circumstances.

The use of check valves are an important part of a wellbore operation. The present disclosure provides improved check valves with a suction force created from fluid flow to retain the blocking member in a specific position once the valve is opened.

BRIEF DESCRIPTION OF THE DRAWINGS

Illustrative examples of the present disclosure are described in detail below with reference to the attached drawing figures, which are incorporated by reference herein, and wherein.

Figure 1A:
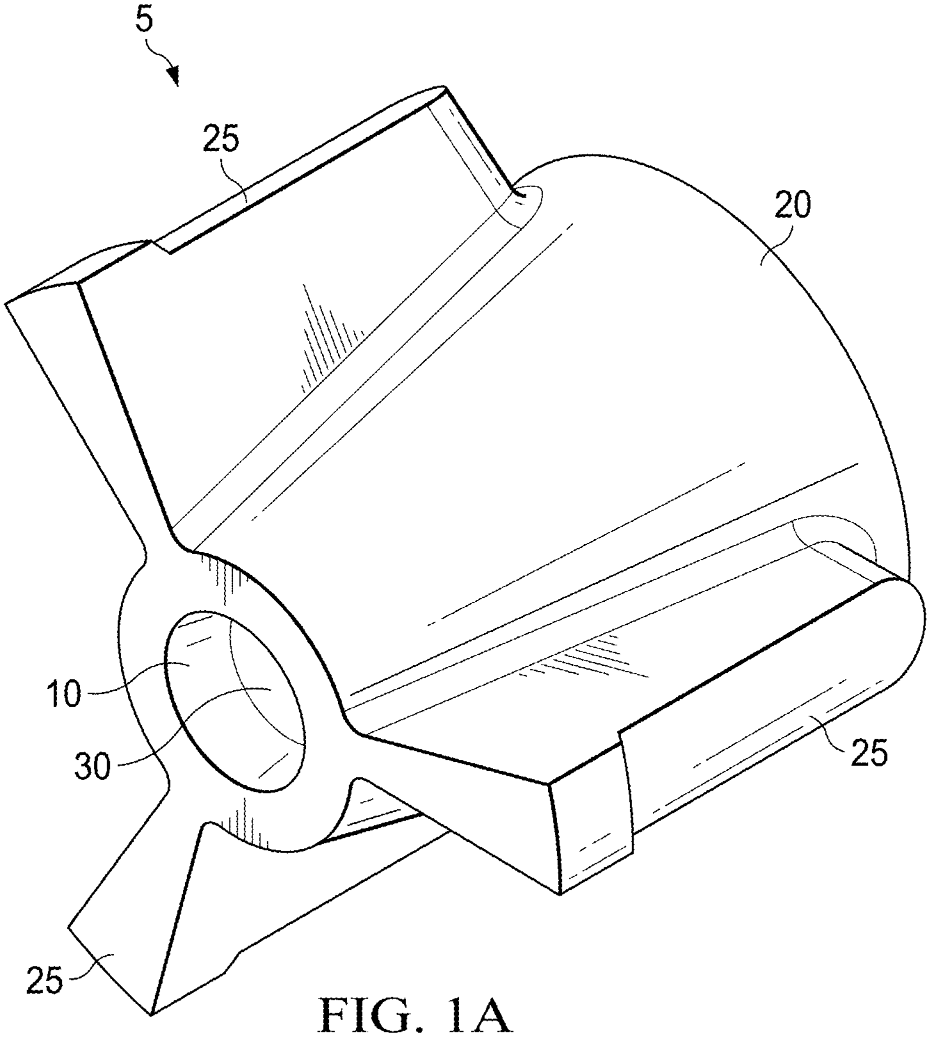
FIG. 1A is a perspective drawing of a suction retainer as positioned to illustrate the low-pressure end of the suction retainer in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to downhole tools, and more particularly, to a suction retainer within a check valve that uses suction to retain the blocking member in a designated position once the valve is opened.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term “about.” Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when “about” is at the beginning of a numerical list, “about” modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms “including” and “comprising” are used in an open-ended fashion, and thus should be interpreted to mean “including, but not limited to.” Unless otherwise indicated, as used throughout this document, “or” does not require mutual exclusivity.

The terms "uphole" and "downhole" may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms "upstream" and "downstream" may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

The present disclosure relates generally to downhole tools, and more particularly, to a suction retainer within a check valve that uses suction to retain the blocking member in a designated position once the valve is opened. Advantageously, the check valves disclosed herein may be utilized with existing wellbore tools and wellbore conduits. As a further advantage, the check valves comprise a suction retainer which utilizes fluid flow around the suction retainer to provide sufficient suction on the blocking member to retain it in a specific position. Retaining the blocking member may prevent chatter or vibration of the blocking member. As a further advantage, the suction retainer may be used with a variety of check valves including those that utilize a ball or poppet as the blocking member. Moreover, the retaining end of the suction retainer may be shaped to correspond to the shape of the blocking member, such that the blocking member may fit snugly into the retaining end of the suction retainer. As a still further advantage, the suction retainer may be manufactured to consist of a single piece or may be composed of multiple pieces fit together to form the suction retainer.

The check valves disclosed herein comprise a valve housing, a blocking member, and a suction retainer. The valve housing comprises a flow path for flow of a fluid through the housing. The flow path is a throughbore in the valve housing with a desired diameter, path, and shape. The flow path is restricted at some point along the length of its longitudinal axis such that the diameter of the flow path is narrowed to form a seat for the blocking member at the opening of the restriction. The blocking member blocks the opening of this restriction to prevent fluid flow out of the restriction and through the remaining portion of the flow path. When the blocking member is disposed against the opening of the restriction, the check valve is not open and fluid does not flow through the check valve. The blocking member moves out of the restriction opening, or seat, when the pressure of the fluid flow through the restriction and against the blocking member exceeds the cracking pressure. Exceeding the cracking pressure of the check valve moves the blocking member away from the restriction opening to open the remainder of the flow path for fluid flow. Flow in the opposing direction will push the blocking member back towards the restriction opening, blocking the restriction and closing the check valve.

A suction retainer is used to retain the blocking member. The suction retainer is disposed in the flow path of the valve housing, but not in the narrowed portion of the restriction. The suction retainer has a central component disposed on the longitudinal axis of the suction retainer. A plurality of supports extends radially from the central component and are used to support and centralize the central component in the flow path of the valve housing. A throughbore is disposed through the central component of the suction retainer along the longitudinal axis. The central component has a retaining end and a low-pressure end. Each end has an opening, with the openings located on opposing ends of the throughbore. The retaining end has a larger diameter than the low-pressure end, The retaining end is the terminal end of the central component that faces the opening of the restriction. When the suction retainer is positioned in the flow path, it is positioned to divert flow to the outside of the central component of the suction retainer. Fluid flow exits through the restriction opening and then flows around the blocking member and the central component. The fluid flow continues around the central component and then over the low-pressure end of the central component. The fluid flow does not enter the throughbore of the central component at the low-pressure end, but instead flows over the opening of the low-pressure end. As the fluid flows over the low-pressure end, the pressure is reduced in the throughbore of the suction retainer. This reduction in pressure creates a suction that pulls and retains the blocking member in the retaining end of the central component where it may remain until fluid flow is halted, or the direction of the fluid flow is reversed.

The suction retainer may be used with a variety of check valves including ball check valves, poppet check valves, disc check valves, or piston check valves. The suction retainer may comprise a variety of materials including, but not limited to, polymeric materials, rubber materials, elastomeric materials, metal or metal alloys, fiber, fiber composites, or combinations of materials. In some examples, the suction retainer may be manufactured to consist of a single continuous piece, for example, via molding or additive manufacturing. In other examples, the suction retainer may be made of several distinct pieces that have been fit together. For example, the supports may be manufactured separately and fit to the central component. In some specific examples which comprise an outer ring, the outer ring and/or supports may be manufactured separately and fit to the central component. In some examples where the components of the suction retainer are distinct, the components may be made from the same or different materials. In some examples, the central component is a frustum. The frustum may be conical or pyramidal. The retaining end of the suction retainer may have a shape that corresponds to the shape of the blocking member. For example, if the blocking member is a ball, the retaining end may be bowl shaped with a size sufficient to house the ball. In alternative examples, the retaining end may have a "V" or conical shape to receive the ball. The retaining end may have any shape sufficient for receiving a corresponding blocking member. In one specific example, the suction retainer does not comprise a distinct dampening mechanism to reduce oscillation. Instead, the suction retainer functions by changing the flow profile around the blocking member such that flow pressure does not increase behind the blocking member as described herein. In some examples, the supports may be fins protruding from the central component and running along the longitudinal axis of the central component for at least a portion of the length of the central component. In other examples, the supports may be columns or pillars. In some examples, an outer ring is present that connects to the plurality of supports and centralizes the central component within the center of the outer ring.

The check valves may be used with a variety of wellbore tools including, but not limited to, flow control devices, flow control valves, downhole pumps, velocity valves, testing tools, and the like. The check valves may be used with a variety of wellbore conduits including, but not limited to, production tubing, the washpipe, the casing, and the like. The check valves may be used in the wall of these conduits or in a mandrel of the same.

Figure 1B:
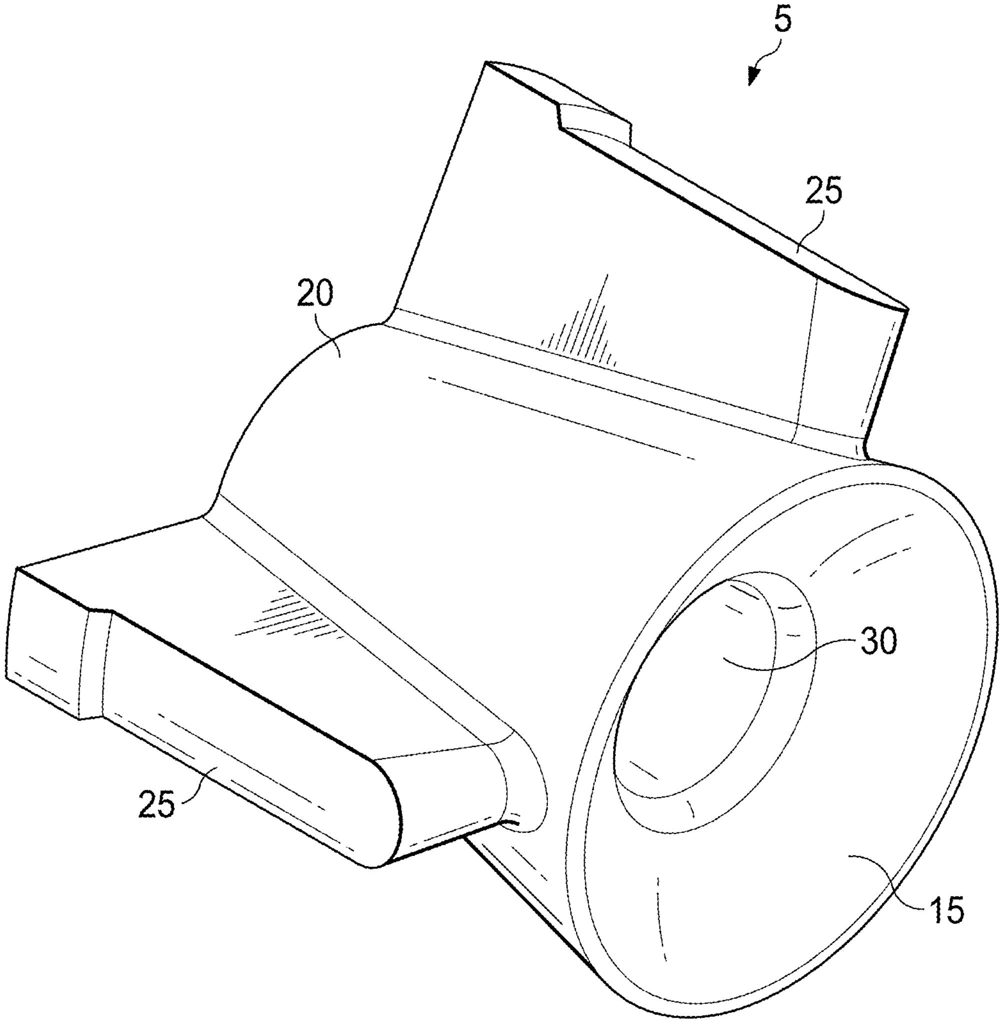
FIG. 1B is a perspective drawing of a suction retainer as positioned to illustrate the retaining end of the suction retainer in accordance with one or more examples described herein.

FIG. 1A is a perspective drawing of a suction retainer 5 as positioned to illustrate the low-pressure end 10 of the suction retainer 5. FIG. 1B is a perspective drawing of a suction retainer 5 as positioned to illustrate the retaining end 15 of the suction retainer 5. The retaining end 15 has a larger diameter than the low-pressure end 10. The retaining end 15 faces the opening of the restriction in the flow path of the check valve. The low-pressure end 10 is on the opposing side and faces away from the restriction opening. Suction retainer 5 further comprises a central component 20 having supports 25 that extend radially outward from the central component 20 and run along the exterior of the central component 20 for at least a portion of the length of the central component 20. The central component 20 is illustrated as a conical shaped frustum, but in alternative examples the central component 20 may be a pyramidal shaped frustum having any number of sides, such as, three, four, five, six, etc. The supports 25 are illustrated as fins, but in alternative examples, the supports may be columns, pillars, or other shapes sufficient for centralizing the central component 20 within the flow path of a check valve and maintaining the positioning and orientation of the central component 20 in the flow path of the check valve.

The central component 20 additionally comprises a throughbore 30 disposed through the central component 20 of the suction retainer 5. The throughbore 30 is disposed along the longitudinal axis of the suction retainer 5 and runs from the low-pressure end 10 to the retaining end 15 of the central component 20. Fluid is diverted by the suction retainer 5 and the blocking member to flow around the suction retainer 5 at the retaining end 15 and across the exterior of the central component 20. Fluid flowing over, but not into, the low-pressure end 10 will reduce the pressure in the throughbore 30 to generate suction at the retaining end 15. This suction retains the blocking member of the check valve at the retaining end 15. In the illustrated example, the retaining end 15 is shaped as a bowl to correspond to a ball-shaped blocking member. In alternative examples, the retaining end 15 may have other shapes including shapes that correspond to poppet or disc-shaped blocking members.

Figure 2:
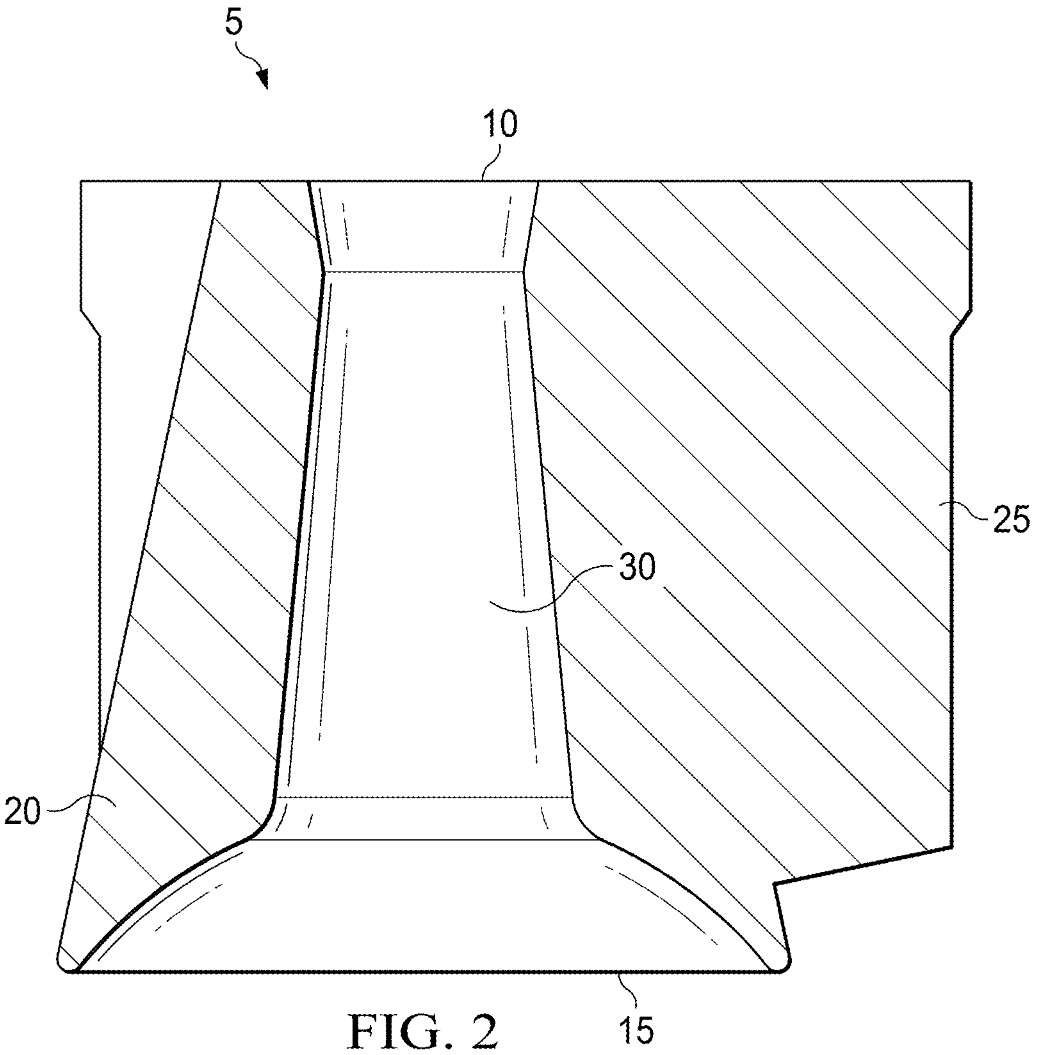
FIG. 2 is a cross-section of the suction retainer of FIGS. 1A and 1B in accordance with one or more examples described herein.

FIG. 2 is a cross-section of the suction retainer 5 of FIGS. 1A and 1B. FIG. 2 illustrates the throughbore 30 as it runs through the length of the longitudinal axis of the suction retainer 5. Low pressure within the throughbore 30 creates suction at the retaining end 15 which may retain the blocking member at the retaining end 15.

It should be clearly understood that the example system illustrated by FIGS. 1A, 1B, and 2 is merely a general application of the principles of this disclosure in practice, and a wide variety of other examples are possible. Therefore, the scope of this disclosure is not limited in any manner to the details of FIGS. 1A, 1B, and 2 as described herein.

Figure 3A:
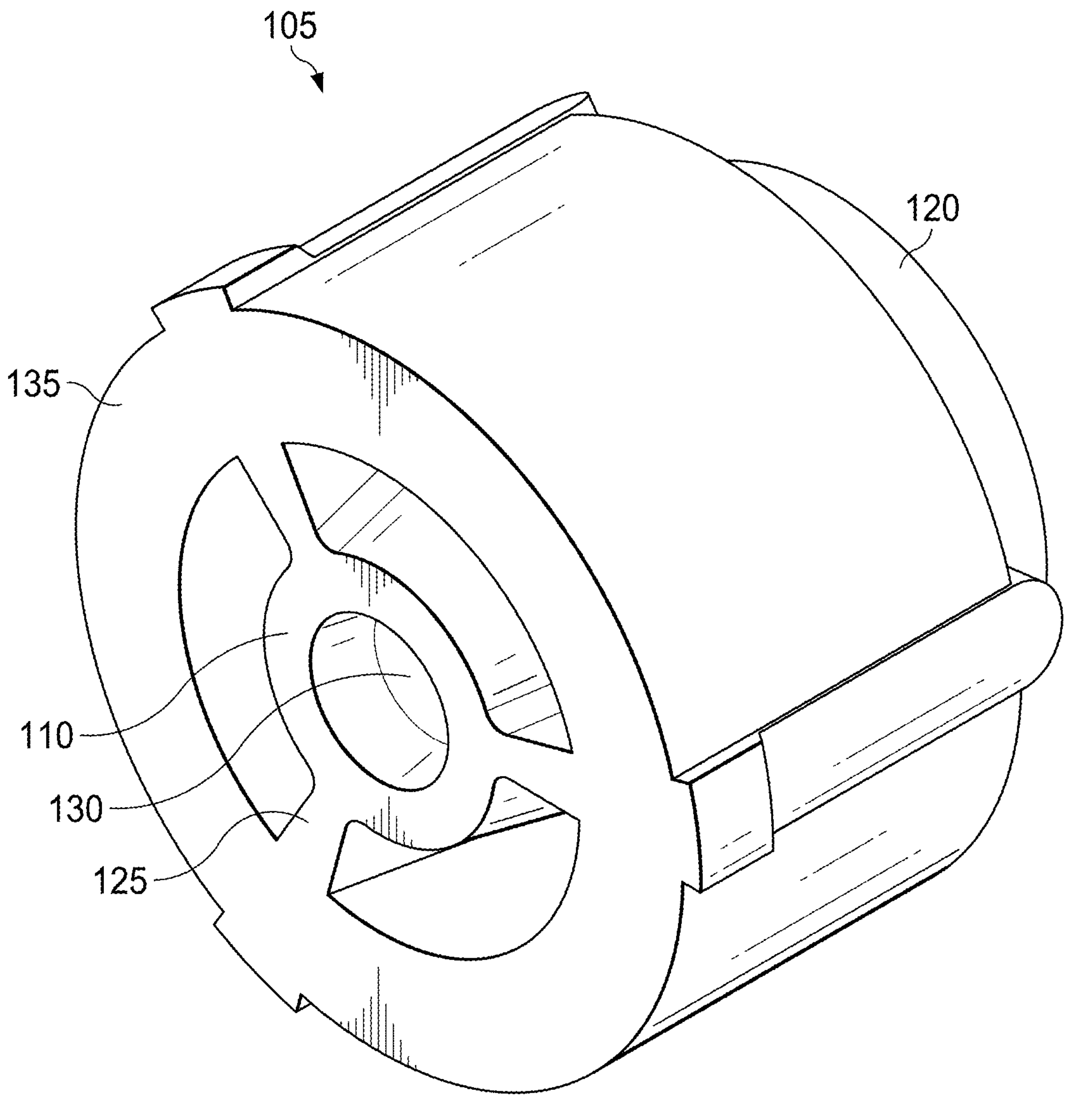
FIG. 3A is a perspective drawing of a second example of a suction retainer as positioned to illustrate the low-pressure end of the suction retainer in accordance with one or more examples described herein.
Figure 3B:
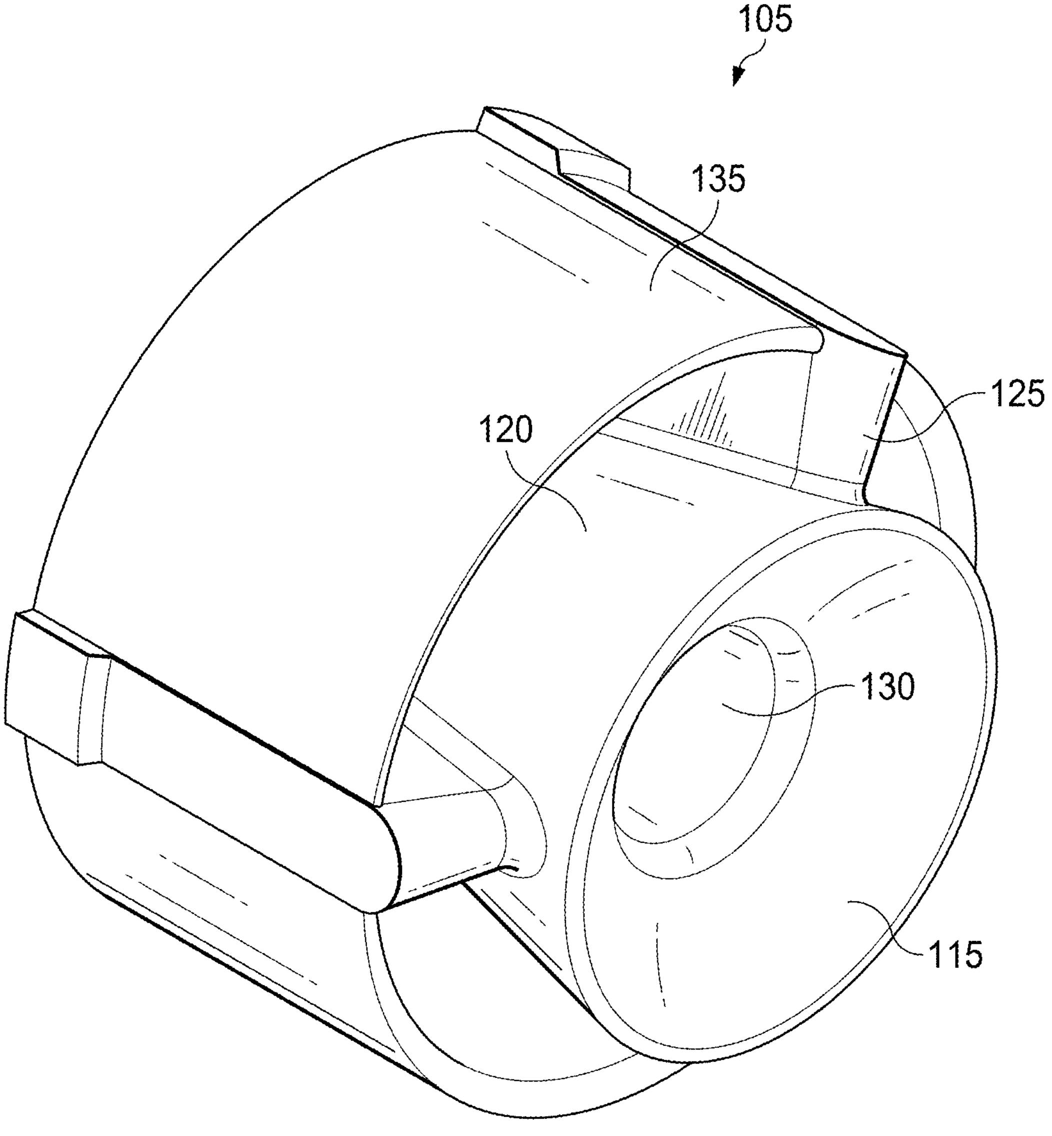
FIG. 3B is a perspective drawing of a second example of a suction retainer as positioned to illustrate the retaining end of the suction retainer in accordance with one or more examples described herein.

FIG. 3A is a perspective drawing of a second example of a suction retainer 105 as positioned to illustrate the low-pressure end 110 of the suction retainer 105. FIG. 3B is a perspective drawing of suction retainer 105 as positioned to illustrate the retaining end 115 of the suction retainer 105. The retaining end 115 has a larger diameter than the low-pressure end 110. The retaining end 115 faces the restriction opening in the flow path of the check valve. The low-pressure end 110 is on the opposing side and faces away from the restriction opening. Suction retainer 105 further comprises a central component 120 having supports 125 that extend radially outward from the central component 20 and run along the exterior of the central component 120 for at least a portion of the length of the central component 120. The central component 120 is illustrated as a conical shaped frustum, but in alternative examples the central component 120 may be a pyramidal shaped frustum having any number of sides, such as, three, four, five, six, etc. Supports 125 are illustrated as fins, but in alternative examples, the supports may be columns, pillars, or other shapes sufficient for centralizing the central component 120 within the flow path of a check valve and maintaining the positioning and orientation of the central component 120 in the flow path of the check valve. Suction retainer 105 additionally comprises an outer ring 135 that connects to the supports 125. The outer ring 135 may assist the supports 125 in centralizing and maintaining the orientation and position of the suction retainer 105 in the flow path of the check valve.

The central component 120 additionally comprises a throughbore 130 disposed through the central component 120 of the suction retainer 105. The throughbore 130 is disposed along the longitudinal axis of the suction retainer 105 and runs from the low-pressure end 110 to the retaining end 115. Fluid is diverted by the suction retainer 105 and the blocking member to flow around the suction retainer 105 at the retaining end 115 and across the exterior of the central component 120. Fluid flowing over, but not into, the low-pressure end 110 will reduce the pressure in the throughbore 130 to generate suction at the retaining end 115. This suction retains the blocking member of the check valve at the retaining end 115. In the illustrated example, the retaining end 115 is shaped as a bowl to correspond to a ball-shaped blocking member. In alternative examples, the retaining end 115 may have other shapes including shapes that correspond to poppet or disc-shaped blocking members.

Figure 4:
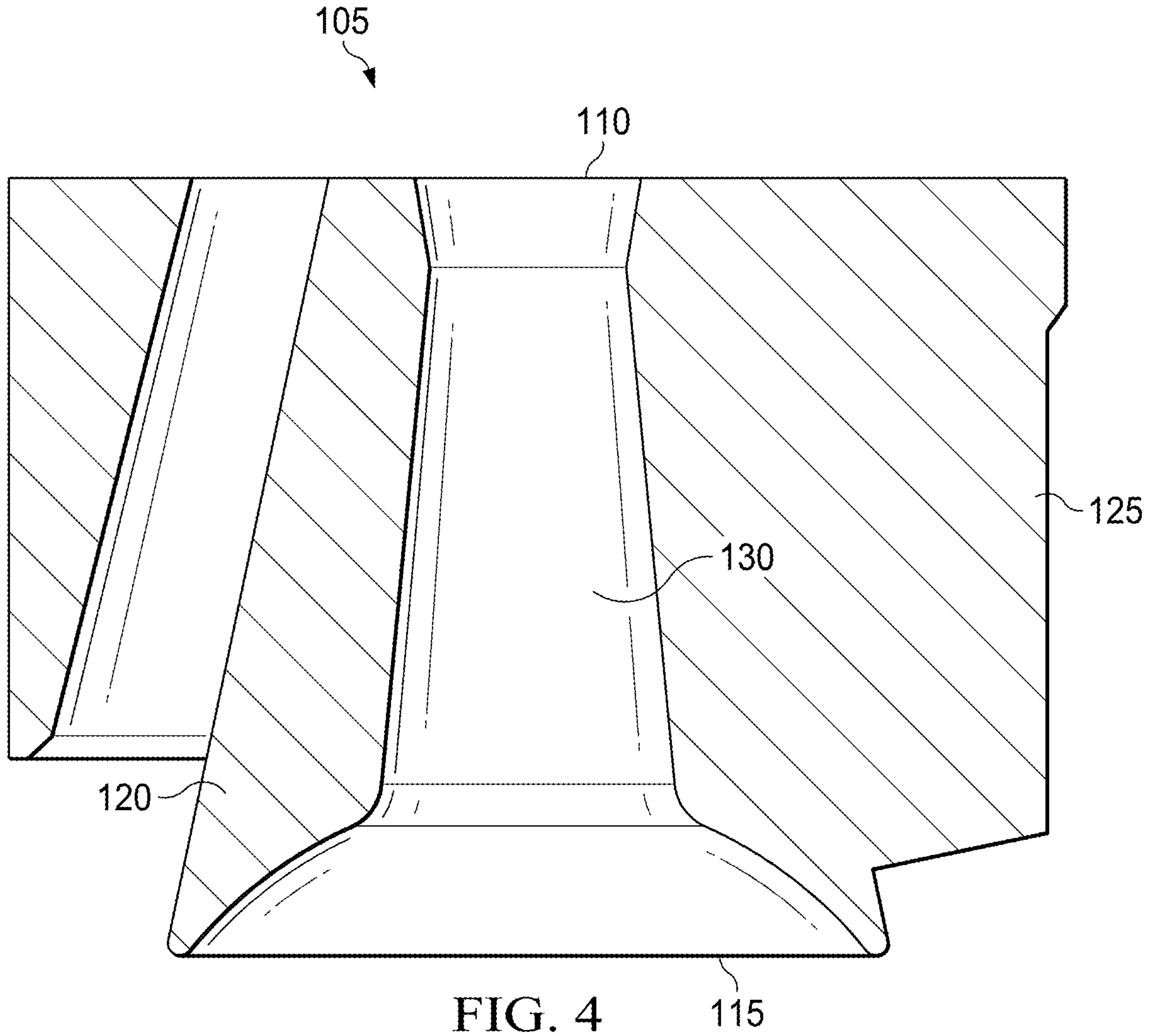
FIG. 4 is a cross-section of the suction retainer of FIGS. 3A and 3B in accordance with one or more examples described herein.

FIG. 4 is a cross-section of the suction retainer 105 of FIGS. 3A and 3B. FIG. 4 illustrates the throughbore 130 as it runs along the length of the longitudinal axis of the suction retainer 105. Low pressure within the throughbore 130 creates suction at the retaining end 115 which may retain the blocking member at the retaining end 115.

It should be clearly understood that the example system illustrated by FIGS. 3A, 3B, and 4 is merely a general application of the principles of this disclosure in practice, and a wide variety of other examples are possible. Therefore, the scope of this disclosure is not limited in any manner to the details of FIGS. 3A, 3B, and 4 as described herein.

Figure 5:
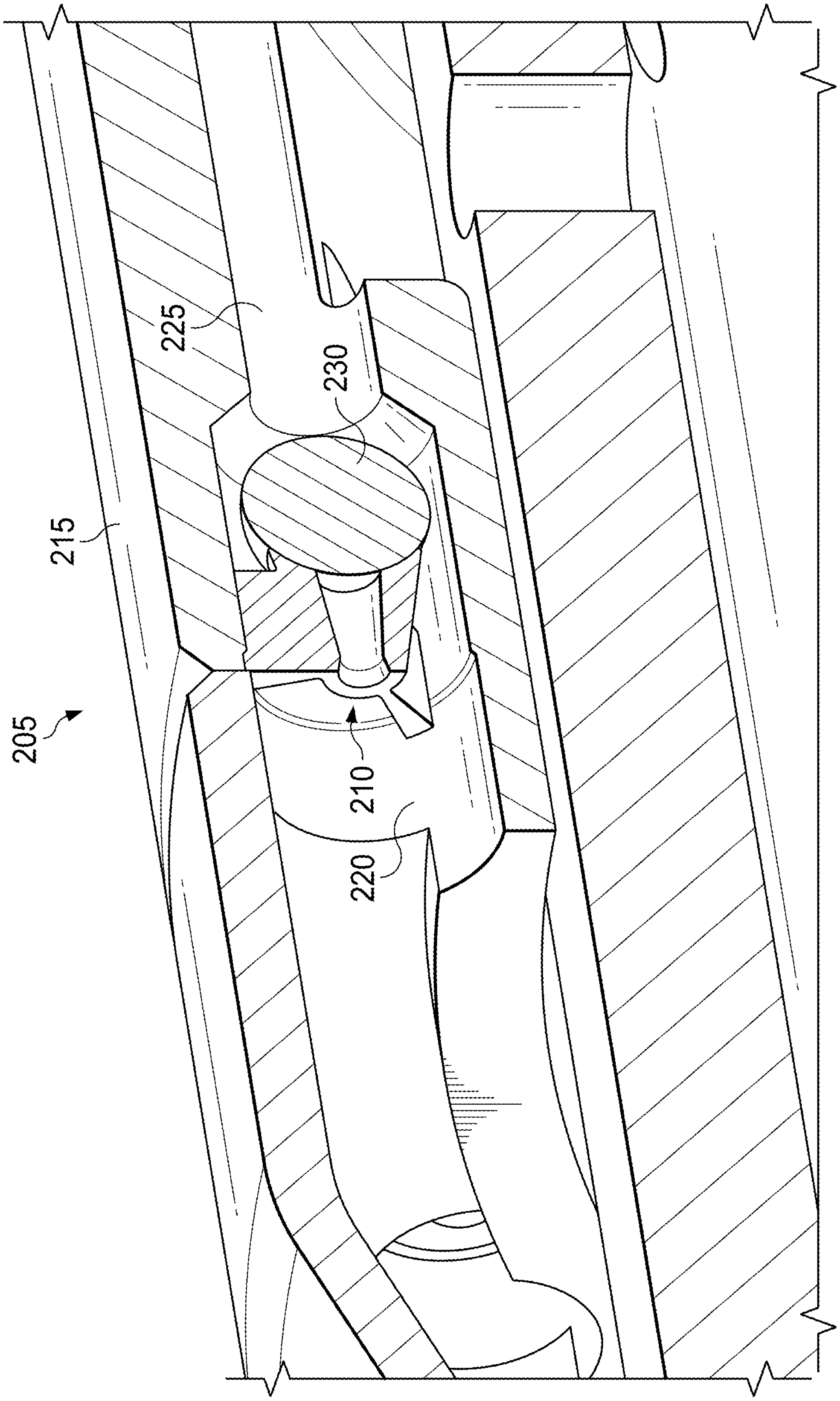
FIG. 5 is a cross-section of a check valve having a suction retainer disposed in the valve housing in accordance with one or more examples described herein.

FIG. 5 is a cross-section of a check valve 205 having a suction retainer 210 disposed in the valve housing 215. The valve housing 215 comprises a flow path 220 disposed therethrough. The valve housing 215 also comprises a restriction 225 that narrows the diameter of the flow path 220 along a portion of the flow path 220. The suction retainer 210 is disposed in the flow path 220, but not in the restriction 225 portion of the flow path 220. The retaining end of the suction retainer 210 faces the opening of the restriction 225. A blocking member 230 is disposed between the retaining end of the suction retainer 210 and the opening of the restriction 225. The blocking member 230 is illustrated as a ball, but in alternative examples may be a disc, poppet, piston, and the like. When the check valve 205 is closed, the blocking member 230 is positioned adjacent to the opening of the restriction 225 to block flow through the flow path 220. When the fluid pressure exceeds the cracking pressure of the blocking member 230, the blocking member 230 is pushed towards the suction retainer 210 and fluid flows through the flow path 220. If the suction retainer 210 was not present, the blocking member 230 may vibrate or chatter within the flow path 220. Fluid flow over the low-pressure end of the suction retainer 210 reduces pressure in the throughbore of the suction retainer 210. A drop in pressure in the throughbore creates suction to retain the blocking member 230 against the retaining end of the suction retainer 210 as illustrated in FIG. 5.

It should be clearly understood that the example system illustrated by FIG. 5 is merely a general application of the principles of this disclosure in practice, and a wide variety of other examples are possible. Therefore, the scope of this disclosure is not limited in any manner to the details of FIG. 5 as described herein.

Figure 6:
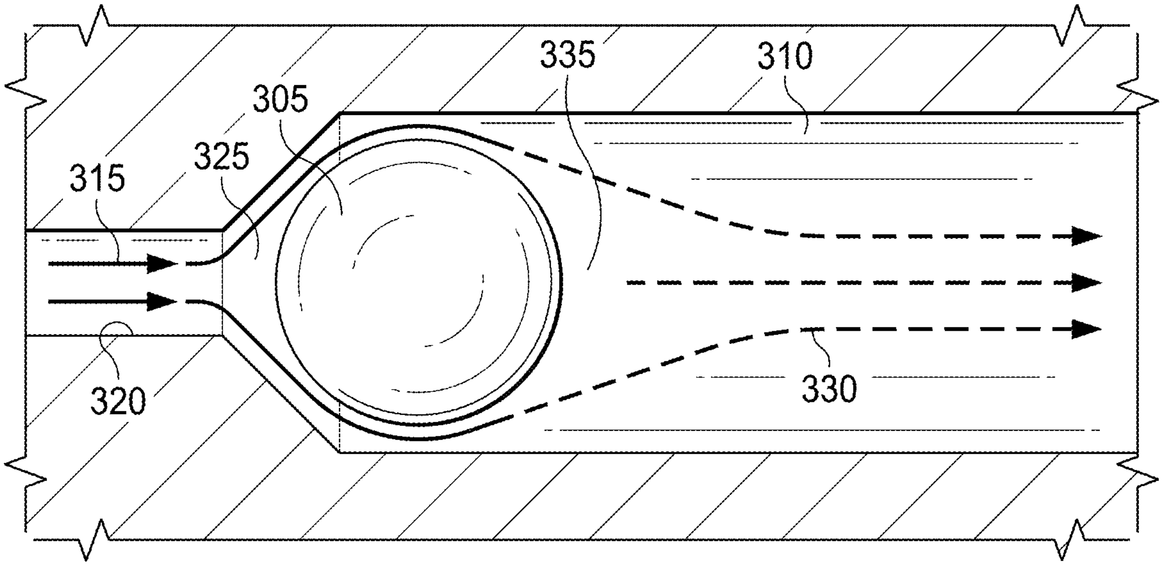
FIG. 6 is a schematic illustrating the fluid flow and pressure zones around a blocking member in the flow path of a check valve in accordance with one or more examples described herein.

FIG. 6 is a schematic illustrating the fluid flow and pressure zones around a blocking member 305 in the flow path 310 of a check valve. Higher velocity fluid 315 exiting the opening of the restriction 320 flows around the blocking member 305 creating a low-pressure zone 325 in front of the blocking member 305. As the higher velocity fluid 315 flows around the blocking member 305, the velocity of the fluid slows towards the backside of the blocking member 305. This lower velocity fluid 330 creates a high-pressure zone 335 on the backside of the blocking member 305. The high-pressure zone 335 on the backside of the blocking member 305 may push the blocking member 305 towards the opening of the restriction 320 until the blocking member 305 is close enough for the higher velocity fluid 315 to apply sufficient force to push the blocking member 305 back against the high-pressure zone 335. This back-and-forth movement of the blocking member 305 in flow path 310 may be undesirable in some circumstances.

Figure 7:
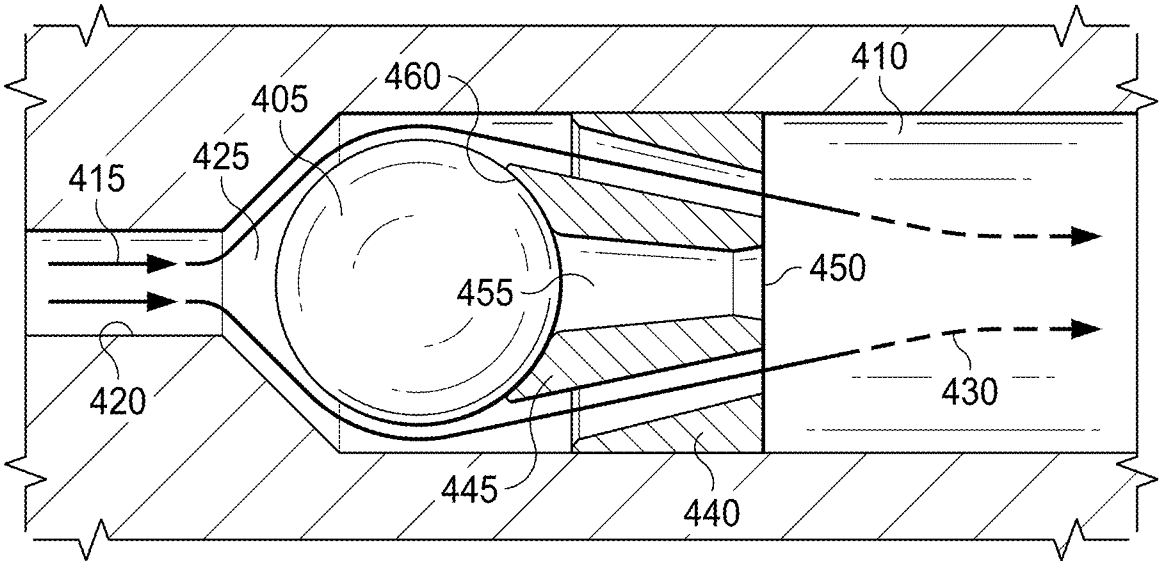
FIG. 7 is a schematic illustrating the fluid flow and pressure zones around a blocking member in the flow path of a check valve having a suction retainer disposed in the flow path in accordance with one or more examples described herein.

FIG. 7 is a schematic illustrating the fluid flow and pressure zones around blocking member 405 in the flow path 410 of a check valve having a suction retainer 440 disposed in the flow path 410. Higher velocity fluid 415 exiting the opening of the restriction 420 flows around the blocking member 405 creating a low-pressure zone 425 in front of the blocking member 405. Unlike in FIG. 6, the suction retainer 440 diverts flow to the exterior of the central component 445 such that the higher velocity fluid 415 flows around the central component 445 which maintains the higher velocity across a longer distance. As the higher velocity fluid 415 flows over the low-pressure end 450 of the suction retainer 440, it creates a low-pressure zone 455 in the throughbore of the central component 445. This low-pressure zone 455 creates suction that retains the blocking member 405 on the retaining end 460.

It should be clearly understood that the example system illustrated by FIGS. 6 and 7 are merely a general application of the principles of this disclosure in practice, and a wide variety of other examples are possible. Therefore, the scope of this disclosure is not limited in any manner to the details of FIGS. 6 and 7 as described herein.

Provided are check valves in accordance with the disclosure and the illustrated FIGS. An example check valve comprises a valve housing comprising a flow path through the valve housing for the flow of a fluid. The flow path has a diameter. The check valve further comprises a restriction in the flow path that narrows the diameter of the flow path, a blocking member disposed in the flow path and configured to move in the flow path to block the restriction and at least partially seal the flow path, and a suction retainer having a longitudinal axis. The suction retainer is disposed in the flow path. The suction retainer comprises a central component disposed on the longitudinal axis and having a throughbore along the longitudinal axis. The central component has a retaining end and a low-pressure end and the retaining end has a larger diameter than the low-pressure end. The retaining end faces the restriction. A plurality of supports extends radially from the central component and the suction retainer is configured to divert flow to an exterior of the central component such that the fluid flows around the central component and over the low-pressure end to reduce pressure in the throughbore. The reduction in pressure retains the blocking member on the retaining end.

Additionally or alternatively, the check valve may include one or more of the following features individually or in combination. The plurality of supports may position and retain the suction retainer in the flow path of the valve housing. An outer ring may be connected to the plurality of supports and the outer ring positions and retains the suction retainer in the flow path of the valve housing. The blocking member may be a ball, poppet, disc, or piston. The central component may be a conical frustum. The central component may be a pyramidal frustum. The retaining end may have a shape corresponding to the blocking member. The retaining end may have a bowl shape to receive the blocking member. The retaining end may have a conical shape to receive the blocking member. The plurality of supports may be fins that run along at least a portion of the central component. The suction retainer may be one piece. The suction retainer may be composed of multiple pieces.

Provided are methods for using a check valve in accordance with the disclosure and the illustrated FIGS. An example method comprises introducing a check valve into a wellbore. The check valve comprises a valve housing comprising a flow path through the valve housing for the flow of a fluid. The flow path has a diameter. The check valve further comprises a restriction in the flow path that narrows the diameter of the flow path, a blocking member disposed in the flow path and configured to move in the flow path to block the restriction and at least partially seal the flow path, and a suction retainer having a longitudinal axis. The suction retainer is disposed in the flow path and the suction retainer comprises a central component disposed on the longitudinal axis and having a throughbore along the longitudinal axis. The central component has a retaining end and a low-pressure end and the retaining end has a larger diameter than the low-pressure end. The retaining end faces the restriction. A plurality of supports extends radially from the central component. The method further comprises flowing a fluid through the flow path and around an exterior of the central component such that the fluid flows around the central component and over the low-pressure end, reducing pressure in the throughbore, and retaining the blocking member on the retaining end.

Additionally or alternatively, the method may include one or more of the following features individually or in combination. The plurality of supports may position and retain the suction retainer in the flow path of the valve housing. An outer ring may be connected to the plurality of supports and the outer ring positions and retains the suction retainer in the flow path of the valve housing. The blocking member may be a ball, poppet, disc, or piston. The central component may be a conical frustum. The central component may be a pyramidal frustum. The retaining end may have a shape corresponding to the blocking member. The retaining end may have a bowl shape to receive the blocking member. The retaining end may have a conical shape to receive the blocking member. The plurality of supports may be fins that run along at least a portion of the central component. The suction retainer may be one piece. The suction retainer may be composed of multiple pieces.

Provided are systems for using a check valve in accordance with the disclosure and the illustrated FIGS. An example system comprises a check valve comprising a flow path through the valve housing for the flow of a fluid. The flow path has a diameter. The check valve further comprises a restriction in the flow path that narrows the diameter of the flow path, a blocking member disposed in the flow path and configured to move in the flow path to block the restriction and at least partially seal the flow path, and a suction retainer having a longitudinal axis. The suction retainer is disposed in the flow path. The suction retainer comprises a central component disposed on the longitudinal axis and having a throughbore along the longitudinal axis. The central component has a retaining end and a low-pressure end and the retaining end has a larger diameter than the low-pressure end. The retaining end faces the restriction. A plurality of supports extends radially from the central component and the suction retainer is configured to divert flow to an exterior of the central component such that the fluid flows around the central component and over the low-pressure end to reduce pressure in the throughbore. The reduction in pressure retains the blocking member on the retaining end. The system further comprises a wellbore tool or conduit having the check valve disposed therein.

Additionally or alternatively, the system may include one or more of the following features individually or in combination. The check valve may be disposed in the wellbore tool and the wellbore tool may be a flow control device, flow control valve, downhole pump, velocity valves, or testing tool. The check valve may be disposed in the wellbore conduit and the wellbore conduit may be a production tubing, a washpipe, or a casing. The plurality of supports may position and retain the suction retainer in the flow path of the valve housing. An outer ring may be connected to the plurality of supports and the outer ring positions and retains the suction retainer in the flow path of the valve housing. The blocking member may be a ball, poppet, disc, or piston. The central component may be a conical frustum. The central component may be a pyramidal frustum. The retaining end may have a shape corresponding to the blocking member. The retaining end may have a bowl shape to receive the blocking member. The retaining end may have a conical shape to receive the blocking member. The plurality of supports may be fins that run along at least a portion of the central component. The suction retainer may be one piece. The suction retainer may be composed of multiple pieces.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A check valve comprising:

a valve housing comprising a flow path through the valve housing for the flow of a fluid;

wherein the flow path has a diameter, a restriction in the flow path that narrows the diameter of the flow path, a blocking member disposed in the flow path and configured to move in the flow path to block the restriction and at least partially seal the flow path, and a suction retainer having a longitudinal axis; wherein the suction retainer is disposed in the flow path; wherein the suction retainer comprises a central component disposed on the longitudinal axis and having a throughbore along the longitudinal axis; wherein the central component has a retaining end and a low-pressure end; wherein the retaining end has a larger diameter than the low-pressure end; wherein the retaining end faces the restriction; wherein a plurality of supports extends radially from the central component; wherein the suction retainer further comprises an outer ring connecting to the plurality of supports; wherein the outer ring positions and retains the suction retainer in the flow path of the valve housing; wherein the ring and plurality of supports at least partially define at least two flow channels that are angled to converge towards the low-pressure end to divert flow around the central component to converge over the low-pressure end to reduce pressure in the throughbore; wherein the reduction in pressure retains the blocking member on the retaining end; and wherein the low pressure end of the central component does not extend past the outer ring in a downstream direction.

2. The check valve of claim 1, wherein the blocking member is a ball, poppet, disc, or piston.

3. The check valve of claim 1, wherein the central component is a conical frustum.

4. The check valve of claim 1, wherein the central component is a pyramidal frustum.

5. The check valve of claim 1, wherein the retaining end has a shape corresponding to the blocking member.

6. The check valve of claim 1, wherein the retaining end has a bowl shape to receive the blocking member.

7. The check valve of claim 1, wherein the retaining end has conical shape to receive the blocking member.

8. The check valve of claim 1, wherein the plurality of supports are fins that run along at least a portion of the central component.

9. The check valve of claim 1, wherein the suction retainer is one piece.

10. The check valve of claim 1, wherein the suction retainer is composed of multiple pieces.

11. A method for using a check valve, the method comprises:

introducing a check valve into a wellbore; wherein the check valve is disposed in a flow control device; the check valve comprising:

a valve housing comprising a flow path through the valve housing for the flow of a fluid; wherein the flow path has a diameter, a restriction in the flow path that narrows the diameter of the flow path, a blocking member disposed in the flow path and configured to move in the flow path to block the restriction and at least partially seal the flow path, a suction retainer having a longitudinal axis; wherein the suction retainer is disposed in the flow path; wherein the suction retainer comprises a central component disposed on the longitudinal axis and having a throughbore along the longitudinal axis; wherein the central component has a retaining end and a low-pressure end; wherein the retaining end has a larger diameter than the low-pressure end; wherein the retaining end faces the restriction; wherein a plurality of supports extends radially from the central component; wherein the suction retainer further comprises an outer ring connecting to the plurality of supports; wherein the outer ring positions and retains the suction retainer in the flow path of the valve housing; wherein the ring and plurality of supports at least partially define at least two flow channels that are angled to converge towards the low-pressure end; and wherein the low pressure end of the central component does not extend past the outer ring in a downstream direction, flowing a fluid through the flow path and around an exterior of the central component in the flow channels such that the fluid flows around the central component to converge over the low-pressure end, reducing pressure in the throughbore, and retaining the blocking member on the retaining end.

12. The method of claim 11, wherein the central component is a conical frustum.

13. The method of claim 11, wherein the central component is a pyramidal frustum.

14. A system for using a check valve, the system comprises:

a check valve comprising:

a valve housing comprising a flow path through the valve housing for the flow of a fluid; wherein the flow path has a diameter, a restriction in the flow path that narrows the diameter of the flow path, a blocking member disposed in the flow path and configured to move in the flow path to block the restriction and at least partially seal the flow path, and a suction retainer having a longitudinal axis; wherein the suction retainer is disposed in the flow path; wherein the suction retainer comprises a central component disposed on the longitudinal axis and having a throughbore along the longitudinal axis; wherein the central component has a retaining end and a low-pressure end; wherein the retaining end has a larger diameter than the low-pressure end; wherein the retaining end faces the restriction; wherein a plurality of supports extends radially from the central component; wherein the suction retainer further comprises an outer ring connecting to the plurality of supports; wherein the outer ring positions and retains the suction retainer in the flow path of the valve housing; wherein the ring and plurality of supports at least partially define at least two flow channels that are angled to converge towards the low-pressure end to divert flow around the central component to converge over the low-pressure end to reduce pressure in the throughbore; wherein the reduction in pressure retains the blocking member on the retaining end, and wherein the low pressure end of the central component does not extend past the outer ring in a downstream direction, and a flow control device having the check valve disposed therein.

15. The method of claim 11, wherein the blocking member is a ball, poppet, disc, or piston.

16. The method of claim 11, wherein the retaining end has a shape corresponding to the blocking member.

17. The method of claim 11, wherein the retaining end has a bowl shape to receive the blocking member.

18. The method of claim 11, wherein the retaining end has conical shape to receive the blocking member.

19. The system of claim 14, wherein the central component is a conical frustum.

20. The system of claim 14, wherein the central component is a pyramidal frustum.

* * * * *